US009500739B2

(12) United States Patent
Woodruff et al.

(10) Patent No.: US 9,500,739 B2
(45) Date of Patent: Nov. 22, 2016

(54) ESTIMATING AND TRACKING MULTIPLE ATTRIBUTES OF MULTIPLE OBJECTS FROM MULTI-SENSOR DATA

(71) Applicant: Knowles Electronics, LLC, Itasca, IL (US)

(72) Inventors: John Woodruff, Palo Alto, CA (US); Carlos Avendano, Campbell, CA (US); Michael M. Goodwin, Scotts Valley, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/666,312

(22) Filed: Mar. 24, 2015

(65) Prior Publication Data

US 2016/0061934 A1    Mar. 3, 2016

Related U.S. Application Data

(60) Provisional application No. 61/972,112, filed on Mar. 28, 2014.

(51) Int. Cl.
  *G10L 15/20* (2006.01)
  *G01S 5/20* (2006.01)
  *G01S 3/802* (2006.01)

(52) U.S. Cl.
  CPC . *G01S 5/20* (2013.01); *G01S 3/802* (2013.01)

(58) Field of Classification Search
  CPC ...... H04W 64/00; G10L 15/08; G10L 15/16; G10L 15/32; G10L 2021/02166
  USPC .......... 704/233; 725/105; 340/945; 348/143, 348/144, 148, 152, 153, 154, 155, 156, 159, 348/E7.086; 701/14
  See application file for complete search history.

(56) References Cited

U.S. PATENT DOCUMENTS

| 5,809,471 A | 9/1998 | Brodsky |
| 6,243,476 B1 | 6/2001 | Gardner |

(Continued)

FOREIGN PATENT DOCUMENTS

| WO | WO2013148588 A1 | 10/2013 |
| WO | WO2014039552 A1 | 3/2014 |
| WO | WO2016109607 A2 | 7/2016 |

OTHER PUBLICATIONS

Non-Final Office Action, Apr. 22, 2016, U.S. Appl. No. 13/849,448, filed Mar. 22, 2013.

(Continued)

*Primary Examiner* — Charlotte M Baker
(74) *Attorney, Agent, or Firm* — Carr & Ferrell LLP

(57) ABSTRACT

Systems and methods for estimating and tracking multiple attributes of multiple objects from multi-sensor data are provided. An exemplary method includes identifying features associated with sensor data. The sensor data represents data captured by at least one of a plurality of acoustic and non-acoustic sensors. Identification of the features associated with the sensor data may be based variously on detected sounds, motions, images, and the like. The exemplary method further includes determining, in parallel, multiple probable objects based at least in part on the identified features. Various embodiments of the method also include forming hypotheses based at least in part on associating identified features with the multiple probable objects and attributing the formed hypotheses to channels. Sequence of the formed hypotheses are constructed. The exemplary system includes a tracking module configured to provide the channels and constructed sequences for use in various signal processing, such as signal enhancement.

20 Claims, 5 Drawing Sheets

(56) References Cited

U.S. PATENT DOCUMENTS

| | | | |
|---|---|---|---|
| 6,593,956 B1 | 7/2003 | Potts et al. | |
| 7,131,136 B2* | 10/2006 | Monroe | G08B 13/19641 |
| | | | 340/945 |
| 8,000,468 B2 | 8/2011 | Huang | |
| 8,194,880 B2 | 6/2012 | Avendano | |
| 8,326,625 B2 | 12/2012 | Adibi | |
| 8,473,287 B2 | 6/2013 | Every et al. | |
| 8,515,707 B2 | 8/2013 | Joseph et al. | |
| 8,577,677 B2 | 11/2013 | Kim et al. | |
| 8,646,060 B1 | 2/2014 | Ben Ayed | |
| 8,712,069 B1 | 4/2014 | Murgia et al. | |
| 8,787,587 B1 | 7/2014 | Murgia et al. | |
| 8,880,396 B1 | 11/2014 | Laroche et al. | |
| 8,935,768 B1 | 1/2015 | Tyree | |
| 9,185,487 B2 | 11/2015 | Solbach et al. | |
| 9,195,994 B1 | 11/2015 | Ellis et al. | |
| 9,294,474 B1 | 3/2016 | Alikhani | |
| 9,344,419 B2 | 5/2016 | Ma | |
| 9,355,234 B1 | 5/2016 | Magi Shaashua et al. | |
| 9,401,158 B1 | 7/2016 | Yen et al. | |
| 2003/0016835 A1 | 1/2003 | Elko et al. | |
| 2003/0236604 A1 | 12/2003 | Lu et al. | |
| 2004/0004554 A1 | 1/2004 | Srinivasan et al. | |
| 2004/0044516 A1 | 3/2004 | Kennewick et al. | |
| 2004/0052391 A1 | 3/2004 | Bren et al. | |
| 2005/0008169 A1 | 1/2005 | Muren et al. | |
| 2006/0217977 A1 | 9/2006 | Gaeta et al. | |
| 2006/0242696 A1 | 10/2006 | Cruzado et al. | |
| 2006/0245601 A1 | 11/2006 | Michaud et al. | |
| 2006/0247927 A1 | 11/2006 | Robbins et al. | |
| 2007/0096979 A1 | 5/2007 | Hinnant et al. | |
| 2007/0186106 A1 | 8/2007 | Ting et al. | |
| 2008/0019548 A1 | 1/2008 | Avendano | |
| 2008/0097998 A1 | 4/2008 | Herbach | |
| 2008/0173717 A1 | 7/2008 | Antebi et al. | |
| 2008/0292112 A1 | 11/2008 | Valenzuela et al. | |
| 2009/0055170 A1 | 2/2009 | Nagahama | |
| 2009/0143972 A1 | 6/2009 | Kitamura et al. | |
| 2009/0207016 A1 | 8/2009 | Laackmann et al. | |
| 2009/0323982 A1 | 12/2009 | Solbach et al. | |
| 2010/0033424 A1 | 2/2010 | Kabasawa et al. | |
| 2010/0128881 A1 | 5/2010 | Petit et al. | |
| 2010/0128894 A1 | 5/2010 | Petit et al. | |
| 2010/0174506 A1 | 7/2010 | Joseph et al. | |
| 2010/0312547 A1 | 12/2010 | Van Os et al. | |
| 2010/0315905 A1 | 12/2010 | Lee et al. | |
| 2010/0318257 A1 | 12/2010 | Kalinadhabhotla | |
| 2011/0172918 A1 | 7/2011 | Tome | |
| 2011/0239026 A1 | 9/2011 | Kulik | |
| 2011/0257967 A1 | 10/2011 | Every et al. | |
| 2011/0320823 A1 | 12/2011 | Saroiu et al. | |
| 2012/0058803 A1 | 3/2012 | Nicholson | |
| 2012/0155645 A1 | 6/2012 | Prochaska et al. | |
| 2012/0252411 A1 | 10/2012 | Johnsgard et al. | |
| 2013/0106894 A1 | 5/2013 | Davis et al. | |
| 2013/0227651 A1 | 8/2013 | Schultz et al. | |
| 2013/0246800 A1 | 9/2013 | Stewart | |
| 2013/0253880 A1 | 9/2013 | Joseph et al. | |
| 2013/0297926 A1 | 11/2013 | Eaton et al. | |
| 2013/0316691 A1 | 11/2013 | Forutanpour et al. | |
| 2013/0332156 A1 | 12/2013 | Tackin et al. | |
| 2014/0020073 A1 | 1/2014 | Ronda et al. | |
| 2014/0075496 A1 | 3/2014 | Prakash et al. | |
| 2014/0082706 A1 | 3/2014 | Banford | |
| 2014/0082715 A1 | 3/2014 | Grajek et al. | |
| 2014/0096178 A1 | 4/2014 | Shippy et al. | |
| 2014/0244192 A1 | 8/2014 | Craig et al. | |
| 2014/0244273 A1 | 8/2014 | Laroche et al. | |
| 2014/0316783 A1 | 10/2014 | Medina | |
| 2014/0325220 A1 | 10/2014 | Tunnell et al. | |
| 2014/0342758 A1 | 11/2014 | Aleksy et al. | |
| 2015/0012248 A1 | 1/2015 | Meduna et al. | |
| 2015/0081296 A1 | 3/2015 | Lee et al. | |
| 2015/0089568 A1 | 3/2015 | Sprague et al. | |
| 2015/0215319 A1 | 7/2015 | Koeten et al. | |
| 2015/0247729 A1 | 9/2015 | Meduna et al. | |
| 2015/0254463 A1 | 9/2015 | Ryhorchuk et al. | |
| 2015/0278797 A1 | 10/2015 | Ratts et al. | |
| 2015/0358752 A1 | 12/2015 | Orman et al. | |
| 2016/0056964 A1 | 2/2016 | Andiappan et al. | |
| 2016/0094548 A1 | 3/2016 | Lee et al. | |
| 2016/0094558 A1 | 3/2016 | Lal et al. | |
| 2016/0189220 A1 | 6/2016 | Verma | |
| 2016/0231830 A1 | 8/2016 | Nemala et al. | |

OTHER PUBLICATIONS

Non-Final Office Action, Feb. 10, 2016, U.S. Appl. No. 14/216,446, filed Mar. 17, 2014.

Non-Final Office Action, May 18, 2016, U.S. Appl. No. 14/713,972, filed May 15, 2015.

International Search Report and Written Opinion mailed Jul. 3, 2013 in Patent Cooperation Treaty Application No. PCT/US2013/033727, filed Mar. 25, 2013.

International Search Report and Written Opinion mailed Dec. 2, 2013 in Patent Cooperation Treaty Application No. PCT/US2013/058055, filed Sep. 4, 2013.

Vinande et al., "Mounting-Angle Estimation for Personal Navigation Devices," IEEE Transactions on Vehicular Technology, vol. 59, No. 3, Mar. 2010, pp. 1129-1138.

Zhao et al., "Towards Arbitrary Placement of Multi-Sensors Assisted Mobile Navigation System," In Proceedings of the 23rd International Technical Meeting of the Satellite Division of the Institute of Navigation, Portland, OR, Sep. 21-24, 2010, pp. 556-564.

Jimenez et al., "A Comparison of Pedestrian Dead-Reckoning Algorithms Using a Low-Cost MEMS IMU," WISP 2009. 6th IEEE International Symposium on Intelligent Signal Processing, Aug. 26-28, 2009. pp. 37-42.

Joseph, Benjamin E. et al., "System and Method for Determining a Uniform External Magnetic Field," U.S. Appl. No. 61/615,327, filed Mar. 25, 2012.

International Search Report and Written Opinion mailed Mar. 16, 2016 in Patent Cooperation Treaty Application No. PCT/US2015/067966, filed Dec. 29, 2016.

Laroche, Jean et al., "Noise Suppression Assisted Automatic Speech Recognition", U.S. Appl. No. 12/962,519, filed Dec. 7, 2010.

Medina, Eitan Asher, "Personalized Operation of a Mobile Device Using Acoustic and Non-Acoustic Information", U.S. Appl. No. 14/542,327, filed Nov. 14, 2014.

Verma, Tony, "Context Aware False Acceptance Rate Reduction", U.S. Appl. No. 14/749,425, filed Jun. 24, 2015.

Vitus, Deborah Kathleen et al., "Method for Modeling User Possession of Mobile Device for User Authentication Framework", U.S. Appl. No. 14/548,207, filed Nov. 19, 2014.

\* cited by examiner

ESTIMATING AND TRACKING MULTIPLE ATTRIBUTES OF MULTIPLE OBJECTS FROM MULTI-SENSOR DATA

CROSS-REFERENCE TO RELATED APPLICATION

The present application claims the benefit of U.S. Provisional Application No. 61/972,112, filed on Mar. 28, 2014. The subject matter of the aforementioned application is incorporated herein by reference for all purposes.

FIELD

The present application relates generally to audio signal processing and, more specifically, to systems and methods regarding multiple attributes of multiple objects, for example, multiple sound sources.

BACKGROUND

Signal enhancement techniques can be driven by the ability to estimate attributes of the physical process that generates a desired signal in order to remove influences of a corrupting process. Some approaches are primarily concerned with estimating one or more attributes of a single physical object. Various approaches have estimated attributes in cascade/sequentially (e.g., first estimating an object's angle, then estimating the fundamental frequency given the angle, and so forth) and often focus on tracking the attributes of only a single dominant object.

SUMMARY

This summary is provided to introduce a selection of concepts in a simplified form that are further described below in the Detailed Description. This summary is not intended to identify essential features of the claimed subject matter, nor is it intended to be used as an aid in determining the scope of the claimed subject matter.

Various embodiments of a system for simultaneous estimating and tracking of multiple attributes of multiple objects from multi-sensor data are disclosed. An exemplary system includes a feature module operable to identify features associated with sensor data, the sensor data representing data captured by at least one of a plurality of sensors. The system can include an object detector operable to determine multiple probable objects based at least in part on the identified features, the determination being made in parallel for the identified features. The system can also include a hypothesis generator operable to form hypotheses based at least in part on associating identified features with the multiple probable objects. A grouping module operable to attribute the formed hypotheses to channels may also be included in the system. Various embodiments of the system include a tracking module operable to construct sequences of the formed hypotheses; the tracking module being configured to provide the channels and constructed sequences.

In various embodiments, the plurality of the sensors includes one or more microphones for capturing sensor data from probable sound source objects. At least one motion sensor may also be included that is operable to detect motions associated with the probable sound sources. The plurality of the sensors may include at least one image sensor to detect images associated with the probable sound sources. The identification of the features associated with the sound source sensor data may be partially based on the detected motions and/or detected images.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
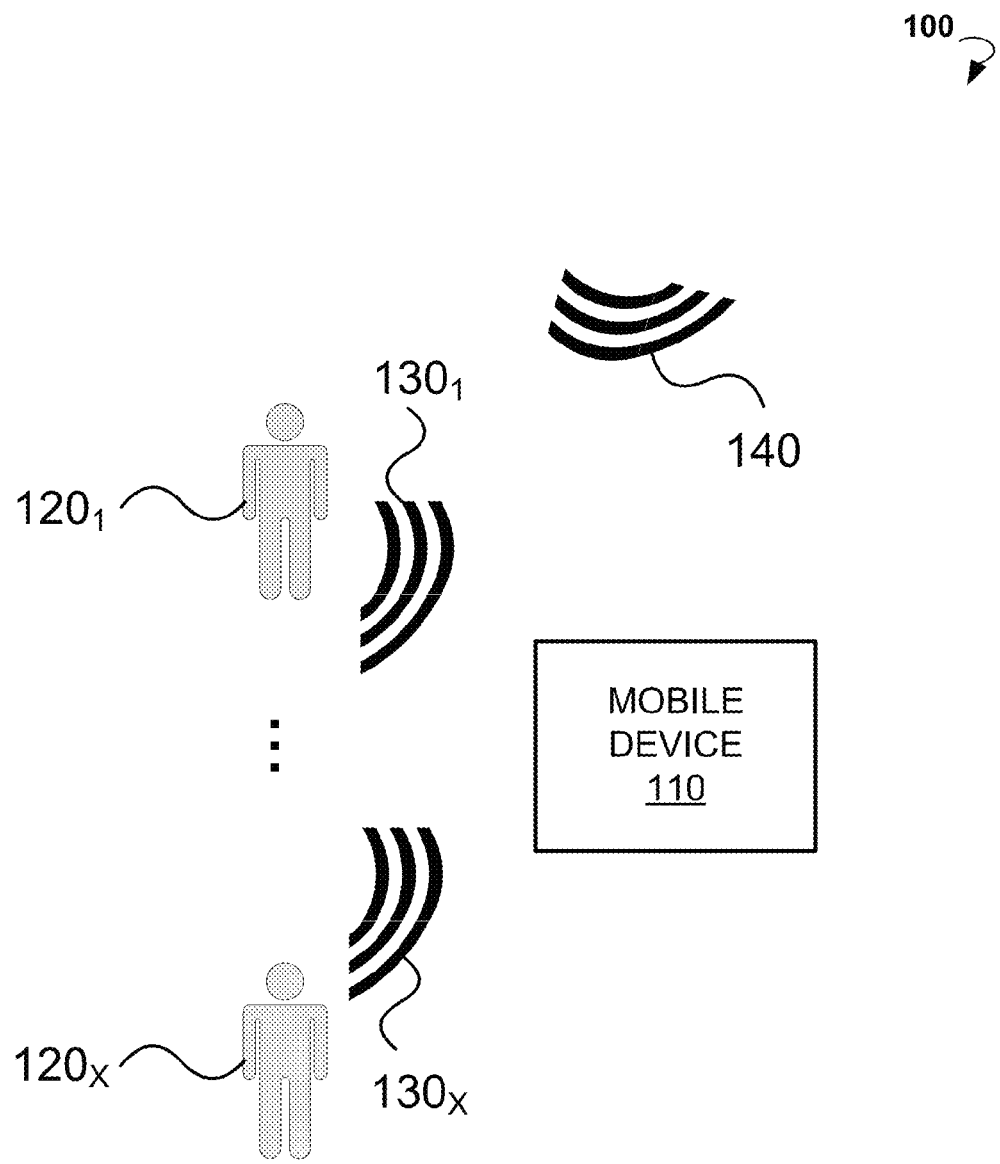
FIG. 1 is block diagram showing an example acoustic environment, according to some embodiments.

Signal enhancement techniques can be driven by the ability to estimate attributes of the physical process that generates a desired signal in order to remove influences of a corrupting process. In audio processing, for example, the relative angle of a desired sound source can be estimated using a microphone array to reduce the contribution of different sound sources and reverberation. The type of sound source or signal's fundamental frequency can be estimated to impose structural constraints on the enhancement process. Improved performance can be attained from estimating and tracking multiple attributes of multiple physical objects in order to better analyze and model real-world sensor data. The estimating and tracking may be done simultaneously for the multiple objects and associated features.

Furthermore, the increased deployment of different types of physical sensors in mobile devices (e.g., microphones, cameras, gyroscopes, Global Positioning System (GPS), biometric, and so forth) provides the opportunity to improve analysis through fusion of information from various sources.

Various embodiments provide systems and methods for estimating and tracking multiple attributes of multiple objects from multi-sensor data. Embodiments of the present disclosure can be practiced on any mobile device configured to receive and/or provide audio, by way of example and not limitation, a wearable, media player, personal digital assistant, mobile telephone, smart phone, phablet, tablet computer, netbook computer, notebook computer, hand-held computing system, other mobile computing system, and the like.

Mobile devices can include: radio frequency (RF) receivers, transmitters, and transceivers; wired and/or wireless telecommunications and/or networking devices; amplifiers; audio and/or video players; encoders; decoders; speakers; inputs; outputs; storage devices; user input devices. Mobile devices may include inputs such as buttons, switches, keys, keyboards, trackballs, sliders, touch screens, one or more microphones, gyroscopes, accelerometers, GPS receivers, and the like. Mobile devices may include outputs, such as LED indicators, video displays, touchscreens, speakers, and the like. In some embodiments, mobile devices may be wearables, hand-held devices, such as wired and/or wireless remote controls, notebook computers, tablet computers, phablets, smart phones, personal digital assistants, media players, mobile telephones, and the like.

Embodiments of the present disclosure may allow estimating and tracking of multiple attributes of multiple sources from sensor data using a framework that is highly scalable in terms of the computational complexity. Some embodiments may also allow fusing information from multiple sensors and identifying and grouping the signal components generated by each detected object.

According to an example embodiment, a method for tracking and estimating multiple attributes of multiple objects from multi-sensor data is provided. The exemplary system includes identifying features associated with sensor data, the sensor data representing data captured by at least one of a plurality of sensors. The method can include determining multiple probable objects based at least in part on the identified features, the determination being made in parallel for the identified features. The method can also include forming hypotheses based at least in part on associating identified features with the multiple probable objects. Various embodiments also include attributing the formed hypotheses to channels and constructing sequences of the formed hypotheses. In some embodiments, the method may include providing the channels and constructed sequences. The method may also include assigning observed signal features to detected objects.

In some embodiments, the method includes transforming data representing at least one captured sound into a digital frequency domain to obtain a sequence of frames of sensor data.

FIG. 1 depicts a block diagram of acoustic environment 100, according to some embodiments. Acoustic environment 100 can include a mobile device 110 and one or more users $120_1$-$120_X$. User(s) $120_1$-$120_X$ may change position relative to mobile device 110, for example, at least one of user(s) $120_1$-$120_X$ moves his/her person, turns his/her head and/or hand holding mobile device 110, and the like. User(s) $120_1$-$120_X$ provide speech $130_1$-$130_X$, respectively. Although user(s) $120_1$-$120_X$ are depicted in FIG. 1 as positioned vertically to the left of mobile device 110, user(s) $120_1$-$120_X$ can be disposed at various positions about mobile device 110.

Acoustic environment 100 can include ambient noise 140. Ambient noise 140 may include, for example, one or more of other people speaking, animal noises (e.g., barking, chirping, and so forth), noise from machines (e.g., airplanes, drones, and fans, to name a few). Although ambient noise 140 is depicted as a single source in one position, ambient noise 140 can be multiple sources disposed at various different positions.

Figure 2:
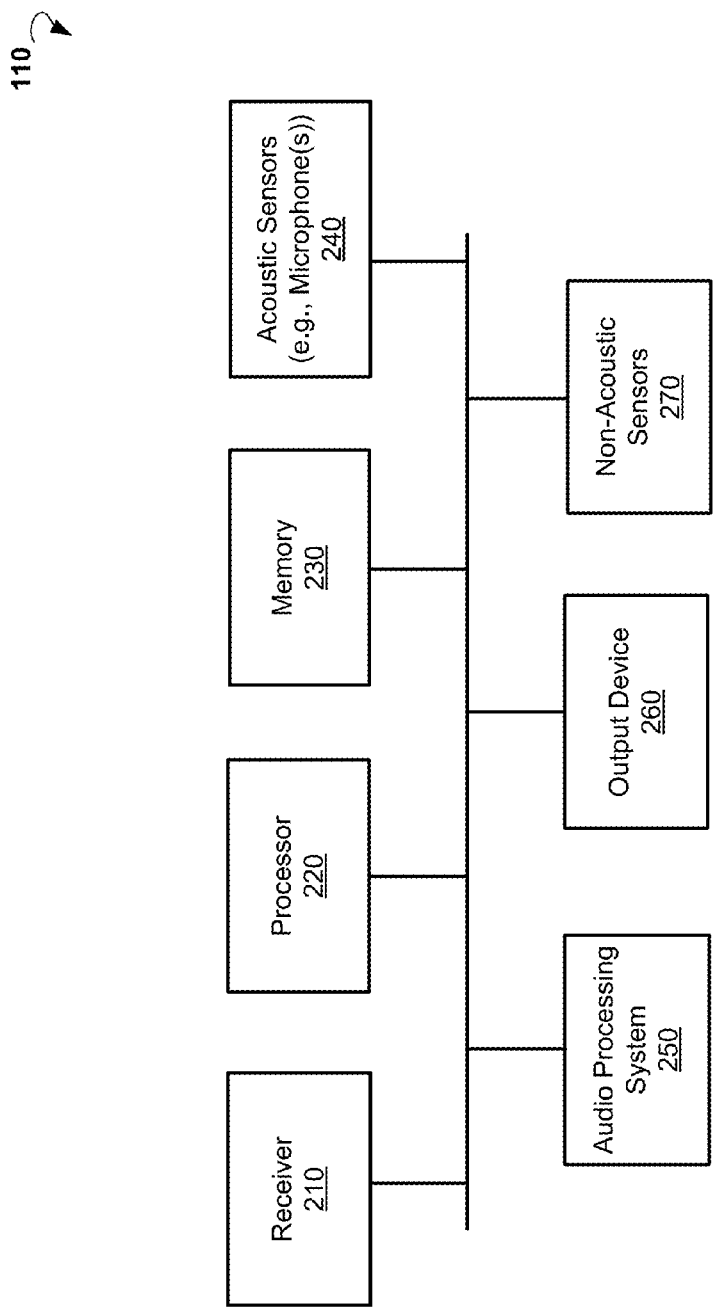
FIG. 2 is a block diagram showing a mobile device that can implement a method for estimating and tracking multiple attributes of multiple objects, according to an example embodiment.

FIG. 2 is a block diagram showing components of a mobile device 110, according to an example embodiment. In illustrated example, mobile device 110 includes a receiver 210, a processor 220, a memory 230, acoustic sensors (e.g., microphone(s)) 240, an audio processing system 250, an output device 260, and non-acoustic sensors 270. In other embodiments, the mobile device 110 includes more or other components to provide a particular operation or functionality. Similarly, in certain embodiments, the mobile device 110 includes fewer components that perform similar or equivalent functions to those depicted in FIG. 2.

The receiver 210 can be configured to communicate with a network, such as the Internet, Wide Area Network (WAN), Local Area Network (LAN), cellular network, and so forth, to receive an audio data stream, which may comprise one or more channels of audio data. The received audio data stream may then be forwarded to the audio processing system 250 and the output device 260.

The processor 220 may include hardware and software that implement the processing of audio data and various other operations depending on a type of the mobile device 110 (for example, communication device and computer). Memory 230 (for example, non-transitory computer readable storage medium) stores, at least in part, instructions and data for execution by processor 220.

The audio processing system 250 may be configured to receive acoustic signals representing at least one sound captured by one or more acoustic sensors (e.g., microphone(s)) 240 and process the acoustic signal components. Although various examples are described in regard to the acoustic sensor(s) 240 being microphone(s) 240, other suitable acoustic sensors may be used. In some embodiments, two or more acoustic sensors (e.g., microphones)) 240 are spaced a distance apart (e.g., at top and bottom of the mobile device 110) such that the acoustic waves impinging on the device from certain directions exhibit different energy levels at the two or more acoustic sensors. After reception by the acoustic sensors (e.g., microphone(s)) 240, the acoustic signals can be converted into electric signals. These electric signals can, in turn, be converted by an analog-to-digital converter into digital signals for processing in accordance with some embodiments described herein.

In other embodiments, where the acoustic sensors (e.g., microphone(s)) 240 are omni-directional microphones that are closely spaced (for example, 1-2 cm apart), a beamforming technique can be used to simulate a forward-facing and backward-facing directional microphone response. A level difference can be obtained using the simulated forward-facing and backward-facing directional microphone. The level difference can be used to discriminate speech and noise in, for example, the time-frequency domain, which can be used in noise and/or echo reduction. In some embodiments, some microphones are used mainly to detect speech and other microphones are used mainly to detect noise. In various embodiments, some microphones are used to detect both noise and speech.

In some embodiments, the audio processing system 250 is configured to carry out noise suppression and/or noise reduction based on level difference (e.g., inter-microphone level difference), level salience, pitch salience, signal type classification, speaker identification, and so forth. An example audio processing system suitable for performing noise reduction is discussed in more detail in U.S. patent application Ser. No. 12/832,901, titled "Method for Jointly Optimizing Noise Reduction and Voice Quality in a Mono or Multi-Microphone System," filed on Jul. 8, 2010, now U.S. Pat. No. 8,473,287, issued on Jun. 25, 2013, the disclosure of which is incorporated herein by reference for all purposes. By way of example and not limitation, noise reduction methods are described in U.S. patent application Ser. No. 12/215,980, entitled "System and Method for Providing Noise Suppression Utilizing Null Processing Noise Subtraction," filed Jun. 30, 2008, and in U.S. patent application Ser. No. 11/699,732, entitled "System and Method for Utilizing Omni-Directional Microphones for Speech Enhancement," filed Jan. 29, 2007, now U.S. Pat. No. 8,194,880, issued on Jun. 5, 2012, which are incorporated herein by reference in their entireties.

The output device 260 is any device that provides an audio output to a listener (e.g., the acoustic source). For example, the output device 260 may comprise a speaker, a class-D output, an earpiece of a headset, or a handset on the mobile device 110.

In various embodiments, the non-acoustic sensors 270 include motion sensors, inertial sensors, proximity sensors, visual sensors, location sensors, and so forth.

Figure 3:
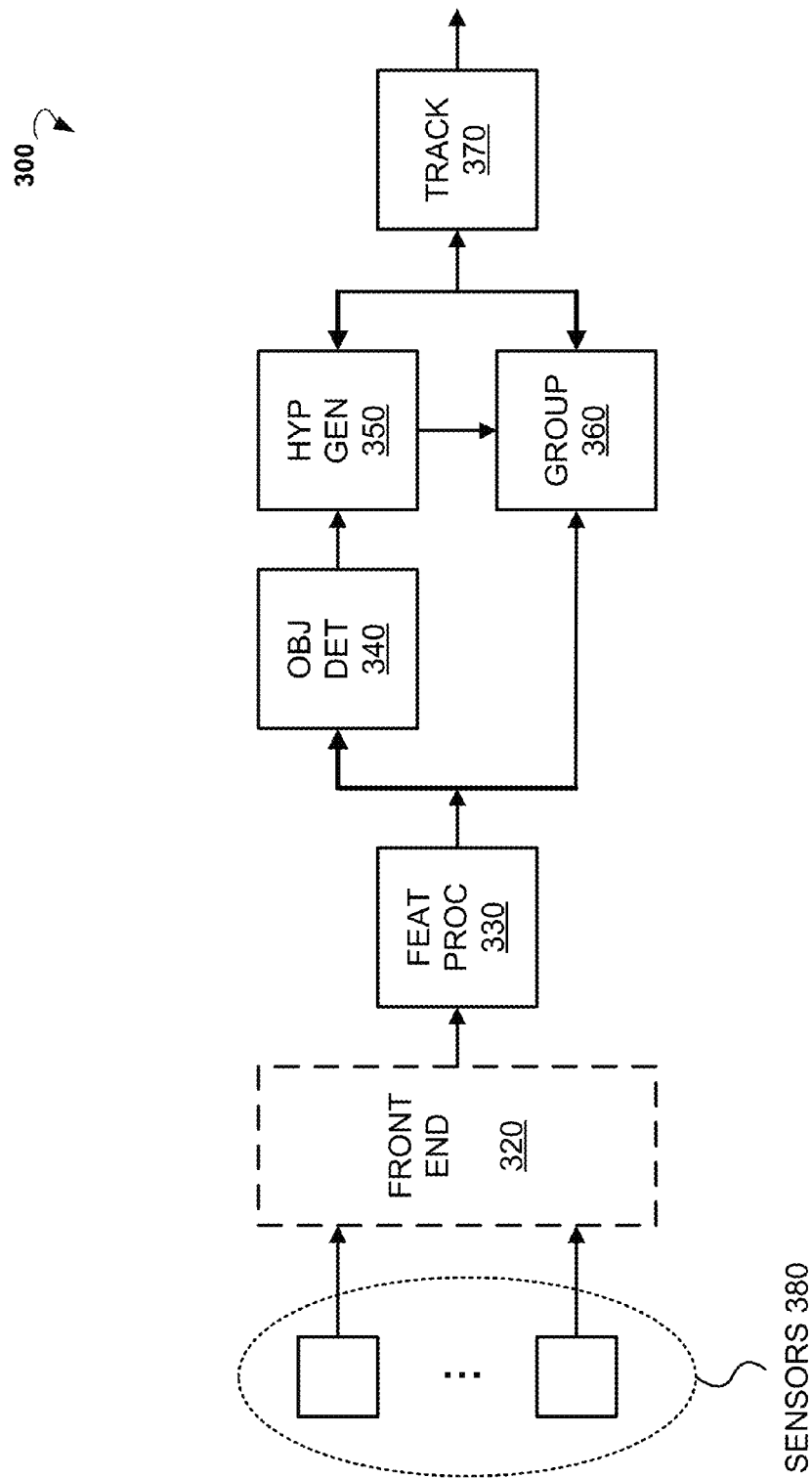
FIG. 3 is a block diagram showing components of a system for estimating and tracking multiple attributes of multiple objects, according to an example embodiment.

FIG. 3 illustrates a simplified block diagram of system 300, according to some embodiments. System 300 includes one or more sensors 380, front end module 320, feature processing ("feat proc") module 330, object detector ("obj det") module 340, hypothesis generator ("hyp gen") module 350, grouping ("group") module 360, and tracking ("track") module 370. In some embodiments, some of the modules 320-370 illustrated in FIG. 3, for example processing module 330, object detector module 340, grouping module 360, and tracking module 370 can be implemented as instructions stored in a memory and executed by a processor. In other embodiments, the modules 320-370 can be implemented in form of specially designed integrated circuits.

The one or more sensors 380 may variously include acoustic sensors 240 and/or non-acoustic sensors 270. In various embodiments, one or more sensors 380 include variously at least one of an acoustic sensor (also referred to herein as a sound sensor), motion and/or orientation (inertial) sensor, environmental sensor, radio, and the like. Sound sensors include, for example, transducers, such as acoustic-to-electric transducers (e.g., microphones) that convert sound into an electrical signal. Sound sensors can sense speech, music, ambient sounds, noise and the like in acoustic environment 100 (FIG. 1).

Motion and/or orientation (inertial) sensors include, for example, magnetometers, accelerometers, gyroscopes, and the like. A magnetometer, such as a compass, measures the strength and/or direction of a magnetic field in order to determine a direction in a frame of reference (e.g., north, south, east, and west). Accelerometers measure acceleration along one or more axes, where the axes are, for example, mutually perpendicular to each other. Gyroscopes (e.g., micro-electro-mechanical systems (MEMS) gyroscopes) measure rotational movement.

Environmental sensors include, for example, thermometers (that measure an ambient temperature and/or temperature gradient), hygrometers (that measure humidity), pressure sensors (that measure an altitude), and photosensors and photodetectors (e.g., cameras, ambient light sensors, and infrared (IR) sensors). Cameras are, for example, charge-coupled device (CCD) image sensors, active-pixel sensor (APS), and the like. Ambient light sensors are, for example, photodiodes, photoresistors, phototransistors, and the like. IR detectors are thermal and/or photonic (e.g., photodiodes).

Radios include, for example, Global Positioning System (GPS) receivers, mobile telephone radios, Wi-Fi devices, Bluetooth radios, and the like. Mobile telephone radios are associated with one or more mobile phone cellular networks. Wi-Fi devices, for example, are based on Institute of Electrical and Electronics Engineers (IEEE) 802.11 standards. Bluetooth radios, for example, correspond to Bluetooth standards overseen by the Bluetooth Special Interest Group (SIG), including but not limited to Bluetooth Low Energy (BLE).

Although various sensors/emitters are described in relation to FIG. 3, different combinations and permutations of types of sensors are possible, according to some embodiments.

Front end module 320 may be included in some embodiments to process signals from sensors 380. For example, front end module 320 performs analog-to-digital conversion of audio signals, transforms the audio signals from the time domain to the frequency domain, and separates the transformed signal into sub-bands (for example, using a filter bank).

Feature processing module 330, for example, removes variance in the sub-band signals that is not relevant to identifying objects. Although objects in some examples and embodiments are described as being sources of sounds with respect to audio processing, the objects are not so limited. For audio processing, exemplary features for the sub-band signals include, but are not limited to, level differences between sub-band signals (e.g., received from different microphones), signal energy, estimated pitch, the estimated saliency of the pitch, spatial location, and so forth.

In various embodiments, object detector module 340 is operable to determine multiple probable objects (e.g., sources of sound) in the signals (e.g., user(s) $120_1$-$120_X$ in FIG. 1), based at least in part on the identified features (e.g., based on the characteristics of the sensor data). For example with regard to sources of sound, a pitch (f) and spatial location (e.g., indicated by angle θ between a microphone and an object) are characteristics (e.g., features) of audio signals.

Object detector module 340 may determine probable objects based at least in part on object options. For example, data driven methods (e.g., neural networks and/or other machine learning techniques) are applied to (e.g., trained with) data about known objects and features (e.g., characteristics) associated with each known object to produce object options. In other words, object options may be predetermined object types. In some embodiments, by identifying probable objects based at least in part on correspondence to one or more object options, object detector module 340 reduces or limits the number of potential objects.

Hypothesis generator module 350 may be operable to form hypotheses based at least in part on associating identified features with the multiple probable objects. In various embodiments, hypothesis generator module 350 enumerates possible combinations of features (characteristics) for each potential object—each possible combination being referred to as a hypothesis—and determines a probability for each hypothesis. In some embodiments, data driven methods (e.g., neural networks and/or other machine learning techniques) are applied (e.g., trained with) characterization of known objects. For example, a neural network is trained with characteristics of known objects/sources at certain locations to provide a probability that a potential object with these characteristics is present.

In various embodiments, the number of hypotheses produced by hypothesis generator module 350 is constrained by assumptions about the number of objects active at any given time. For example, general background noise may not be actively tracked. According to some embodiments, two to three possible objects are tracked per frame substantially simultaneously without multiplexing.

In some embodiments, hypothesis generator module 350 keeps a predetermined number of probable hypotheses. In addition to or alternatively, hypothesis generator module 350 keeps a variable number of probable hypotheses based at least on a probability threshold. For example, a smaller set of hypotheses is retained when the determination of objects is clearer, and a larger set of hypotheses is retained when the determination of objects is more ambiguous.

In various embodiments, once hypothesis generator module 350 identifies probable hypotheses in a frame, hypothesis generator module 350 processes the next frame. A sequence of hypotheses results, wherein hypotheses across frames may be linked together by an association to a particular object.

The grouping module 360 may be operable to attribute the formed hypotheses to channels. For example, the grouping module 360 may attribute the formed hypotheses to certain sub-bands, e.g., filter bank channels. In some embodiments, based on features (e.g., characteristics such as frequencies) associated with particular objects at a given time (e.g., for a given frame) by hypothesis generator module 350, the grouping module 360 assigns the formed hypotheses, associated with the objects, to channels.

In various embodiments, tracking module 370 is operable, in parallel with (and in some embodiments operable simultaneously with) at least one of the object detector, hypothesis generator and grouping module, and is operable to construct sequences of the formed hypotheses. The tracking module 370 may be configured to provide the channels and constructed sequences. In some embodiments, tracking module 370 provides the probable hypothesis sequences over time (e.g., across multiple frames) including: the number of objects, attributes for each detected object, and assigns observed signal features to detected objects.

Some embodiments of the present disclosure include data from other sensors of one or more sensors 380. For example, motion sensors can be used to inform the tracking of the relative angle ($\theta$) between mobile device 110 (FIG. 1) and each respective object, for example, to distinguish between movement of mobile device 110 and movement of user(s) $120_1$-$120_X$ (FIG. 1). Photodetectors may be used to identify objects, for instance, faces are identified in still images (where a face can be one of user(s) $120_1$-$120_X$). By way of further example, moving mouths are detected in video (where a moving mouth can be one of user(s) $120_1$-$120_X$ and/or associated with an audio signal). Various embodiments detect key clicks to remove noise generated by keyboards.

Figure 4:
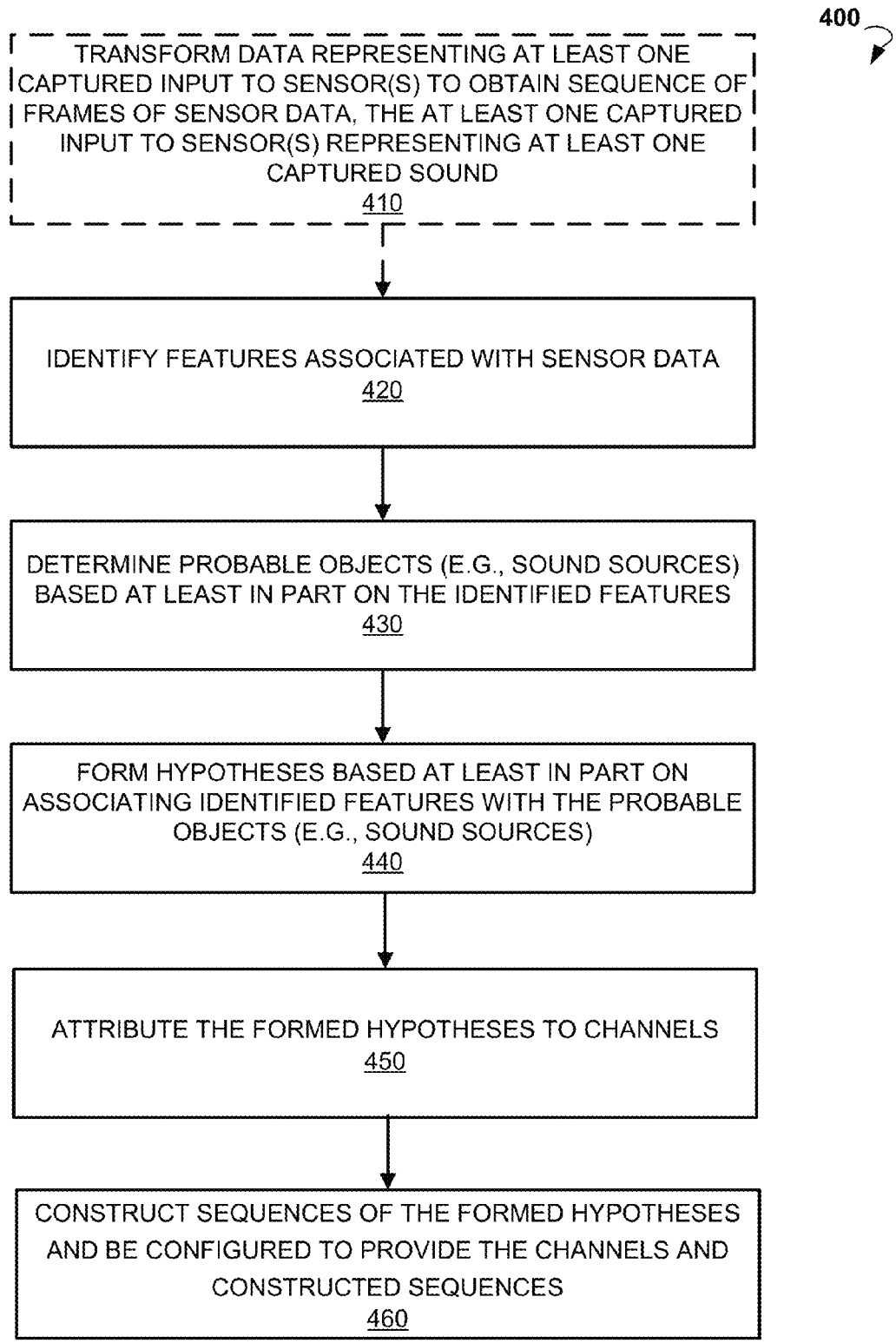
FIG. 4 is a flowchart showing steps of a method for estimating and tracking multiple attributes of multiple objects, according to an example embodiment.

FIG. 4 is a flowchart showing steps of a method 400 for estimating and tracking multiple attributes of multiple objects, according to an example embodiment.

In block 410, method 400 may include transforming data that represents at least one captured input to sensor(s) in order to obtain sequence of frames of sensor data. The at least one captured input to sensor(s) may represent at least one captured sound. The transforming may include performing an analog-to-digital conversion of the audio signal to generate a (digital) acoustic signal, where the (digital) acoustic signal is transformed from the time domain to a frequency domain. The transformed acoustic signal may be separated into sub-band signals.

In block 420, the method 400 allows for identifying features associated with the sensor data. In various embodiments, the features include energy level differences between the sub-band signals, energies of the sub-band signals, pitches, saliences of the pitches, spatial locations, and so forth.

In block 430, the exemplary method 400 includes determining probable objects (e.g., sound sources) based at least in part on the identified features. In various embodiments, the probable objects are associated with multiple sound sources. The probable objects may be associated with multiple objects that are active, at least some of the time, at the same time (i.e., simultaneously). In some embodiments, the probable objects are determined by selecting the probable objects from a list of pre-determined object types. In certain embodiments, the pre-determined object types are generated via a neural network (and/or other machine learning technique) previously trained using a plurality of known objects and features associated with each of the known objects.

In block 440, the exemplary method 400 includes forming hypotheses based at least in part on associating identified features with the probable objects (e.g., sound sources). In some embodiments the hypotheses are formed by enumerating possible combinations of the features associated with the probable objects and determining probabilities of the possible combinations of the features.

In block 450, the method 400 may include attributing the formed hypotheses to channels. For example, formed hypotheses are assigned to one or more sub-bands, e.g., filter bank channels.

In block 460, the exemplary method 400 includes constructing sequences of the formed hypotheses and being configured to provide the channels and constructed sequences. The sequences may include a number of hypotheses, attributes of objects associated with the hypotheses, and features associated with the hypotheses.

Figure 5:
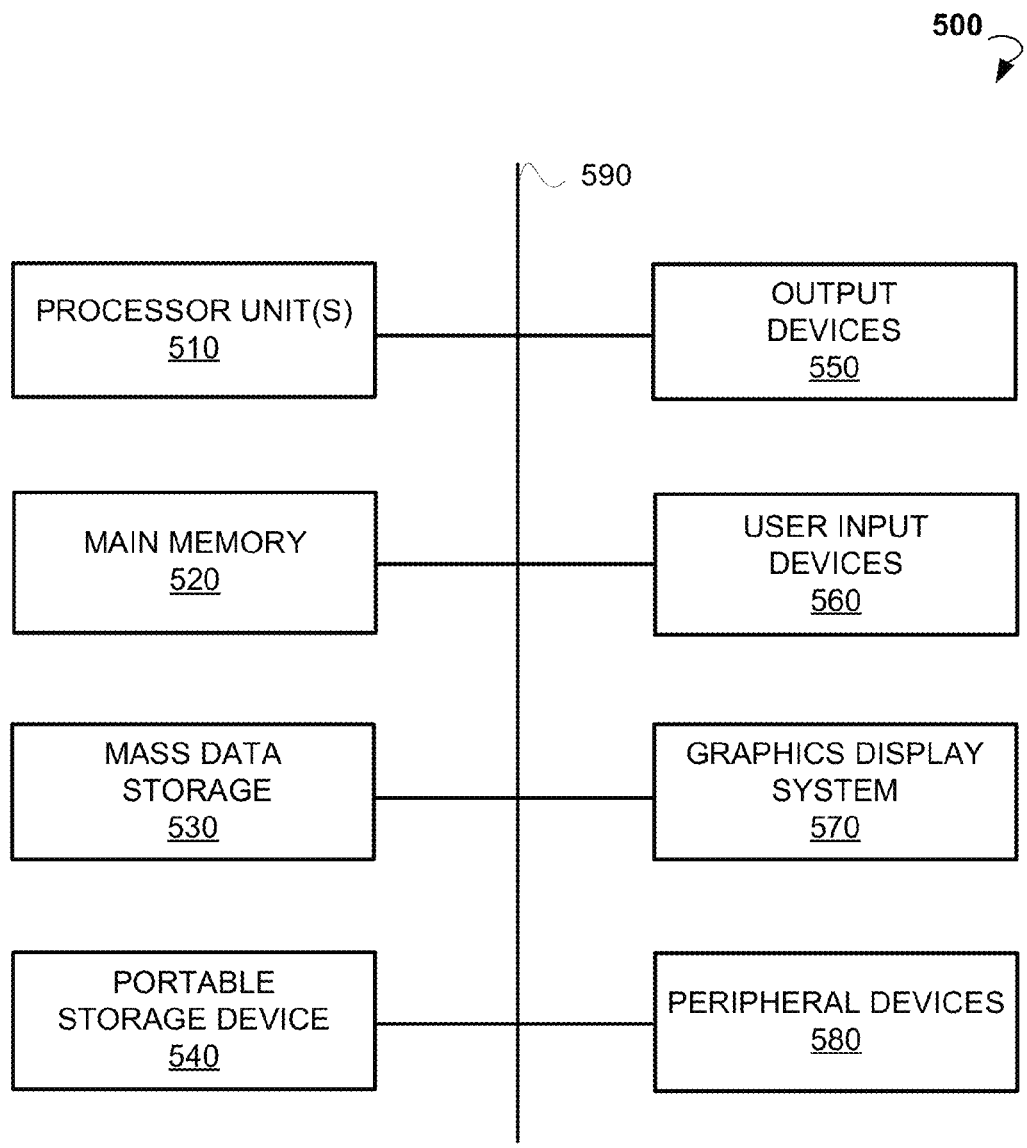
FIG. 5 is a block diagram of an example computer system that may be used to implement embodiments of the present disclosure.

FIG. 5 illustrates an exemplary computer system 500 that may be used to implement some embodiments of the present disclosure. The computer system 500 of FIG. 5 may be implemented in the contexts of the likes of computing systems, networks, servers, or combinations thereof. The computer system 500 of FIG. 5 includes one or more processor units 510 and main memory 520. Main memory 520 stores, in part, instructions and data for execution by processor unit(s) 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit(s) 510 and main memory 520 is connected via a local microprocessor bus, and the mass data storage 530, peripheral device(s) 580, portable storage device 540, and graphics display system 570 are connected via one or more input/output (I/O) buses 590.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 includes a liquid crystal display (LCD) or other suitable display device. Graphics display system 570 is configurable to receive textual and graphical information and processes the information for output to the display device.

Peripheral devices 580 may include any type of computer support device to add additional functionality to the computer system 500.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a wearable, personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used, including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (for example, cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A system for estimating and tracking multiple attributes of multiple objects from multi-sensor data, the system comprising:
   an object detector stored in memory and executed by at least one processor to determine multiple probable objects based at least in part on features associated with sensor data, the sensor data representing data captured by at least one of a plurality of sensors, the determination being made in parallel for the features;
   a hypothesis generator stored in memory and executed by the at least one processor to form hypotheses based at least in part on associating the features with the multiple probable objects;
   a grouping module stored in memory and executed by the at least one processor to attribute the formed hypotheses to channels; and
   a tracking module stored in memory and executed by the at least one processor to construct sequences of the formed hypotheses; the tracking module being configured to provide the channels and constructed sequences for use in signal processing.

2. The system of claim 1, wherein the determination is performed simultaneously for the multiple probable objects.

3. The system of claim 1, wherein the sensor data comprises at least one audio signal representing at least one captured sound, at least some of the multiple probable objects are sound sources, and the plurality of the sensors includes at least two microphones configured to capture the at least one sound.

4. The system of claim 3, further comprising a front end module operable to transform data representing the at least one captured sound to obtain a sequence of frames of the sensor data.

5. The system of claim 4, wherein the transformation includes:
   performing an analog-to-digital conversion of the at least one audio signal to generate a digital acoustic signal;
   transforming the digital acoustic signal from a time domain to a frequency domain; and
   separating the transformed digital acoustic signal into sub-band signals.

6. The system of claim 5, wherein identification of the features includes:
   detecting variance in the sub-band signals that is not relevant to the multiple probable objects; and
   removing the detected variance from the sub-band signals, so as to provide the sensor data, associated with the at least one audio signal, with the detected variance removed.

7. The system of claim 5, wherein the features include one or more of the following: energy level differences between the sub-band signals, energies of the sub-band signals, pitches, saliences of the pitches, and spatial locations.

8. The system of claim 7, wherein the spatial locations include relative angles associated with probable sound sources.

9. The system of claim 1, wherein the attributing the formed hypotheses to the channels includes assigning the formed hypotheses to one or more sub-bands, the one or more sub-bands being associated with filter bank channels.

10. The system of claim 1, wherein:
    the plurality of the sensors includes a motion sensor operable to detect motions associated with the multiple probable objects and an image sensor operable to detect images associated with the multiple probable objects; and
    identification of the features is at least partially based on the detected motions and detected images.

11. The system of claim 1, wherein the determining the multiple probable objects includes selecting the multiple probable objects from a list of pre-determined object types.

12. The system of claim 11, wherein the pre-determined object types are generated via a neural network previously trained using a plurality of known objects and features associated with each of the known objects.

13. The system of claim 1, wherein the forming hypotheses includes:
enumerating possible combinations of the features associated with the multiple probable objects; and
determining probabilities of the possible combinations of the features.

14. The system of claim 13, wherein the probabilities are generated using a machine learning technique previously trained using a plurality of known objects and combinations of the features associated with each of the known objects.

15. The system of claim 13, wherein a number of the formed hypotheses is determined based at least on a minimum probability threshold.

16. The system of claim 1, wherein a number of the formed hypotheses is fixed to a pre-determined number.

17. The system of claim 4, wherein constructing the sequences of the formed hypotheses includes linking the formed hypotheses associated with multiple frames from the sequence of the frames of the sensor data.

18. The system of claim 1, wherein the sequences of the formed hypotheses includes a number of the formed hypotheses, attributes of objects associated with each of the formed hypotheses, and features associated with each of the formed hypotheses.

19. A method for estimating and tracking multiple attributes of multiple objects from multi-sensor data, the method comprising:
determining multiple probable objects based at least in part on features associated with sensor data, the sensor data representing data captured by at least one of a plurality of sensors, the determining being performed in parallel for the features;
forming hypotheses based at least in part on associating the features with the multiple probable objects;
attributing the formed hypotheses to channels; and
constructing sequences of the formed hypotheses; the channels and constructed sequences being configured for use in signal processing.

20. A non-transitory computer-readable storage medium having embodied thereon instructions, which when executed by one or more processors, perform steps of a method, the method comprising:
determining multiple probable objects based at least in part on features associated with sensor data, the sensor data representing data captured by at least one of a plurality of sensors, the determination being made in parallel for the features;
forming hypotheses based at least in part on associating the features with the multiple probable objects;
attributing the formed hypotheses to channels; and
constructing sequences of the formed hypotheses, the channels and constructed sequences being configured for use in signal processing.

* * * * *